Sept. 11, 1956     W. RODENACKER     2,762,390
APPARATUS FOR MAINTAINING LIQUIDS AT A CONSTANT LEVEL IN A TANK
Filed March 2, 1953

INVENTOR:
WOLF RODENACKER
BY
ATTORNEYS

United States Patent Office 2,762,390
Patented Sept. 11, 1956

2,762,390

APPARATUS FOR MAINTAINING LIQUIDS AT A CONSTANT LEVEL IN A TANK

Wolf Rodenacker, Dormagen, Germany, assignor to Farbenfabriken Bayer Aktiengesellschaft, Leverkusen, Germany, a corporation of Germany Application March 2, 1953, Serial No. 339,874

Claims priority, application Germany March 3, 1952

6 Claims. (Cl. 137—394)

The present invention relates to an apparatus for maintaining liquids at a constant level in a tank.

In accordance with the invention, there is provided an apparatus for controlling the rate of flow into a tank, which allows of maintaining a liquid in the tank at a constant level. In the feed pipe wherein the liquid is conveyed under constant pressure into the tank, there is arranged a device for conveying liquids as a member producing counterpressure, which is higher than the said constant pressure in the feed pipe, said member communicating with the tank and being arranged at the height of the liquid level to be kept in the tank. When the liquid level rises the conveying device immerses in the liquid and takes off liquid from the tank into the feed pipe, thus preventing the admission of further quantities of liquid from the feed pipe into the tank.

Figure 1:
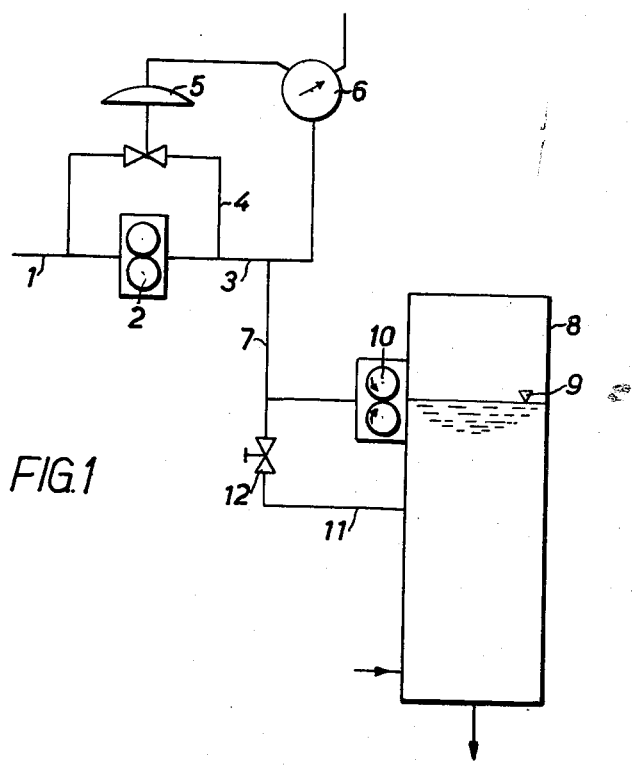
Figure 2:
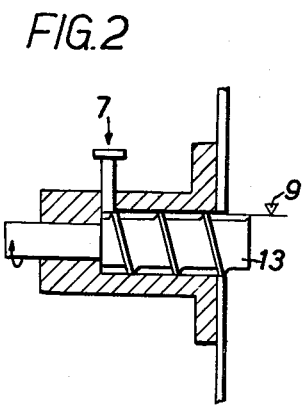
Figure 3:
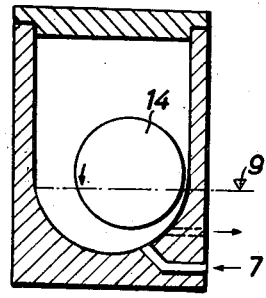

An apparatus according to the invention is shown by way of example in the accompanying drawing in which Fig. 1 is a sectional elevation and plan of the apparatus wherein the conveying device producing counterpressure consists of a gear pump, Fig. 2 is a sectional view of a screw conveyer as an alternative to the gear pump shown in Fig. 1;

Fig. 3 is a sectional view of a pump comprising a casing in which is a cylindrical roll designed so as to form a wedge-shaped clearance between the casing and the roll as another alternative to the gear pump shown in Fig. 1.

Referring to Fig. 1, the liquid is conveyed into the pipe 3 over the supply pipe 1 wherein a gear pump 2 is arranged. The gear pump 2 is equipped with a by-pass pipe 4 through which the quantity of liquid conveyed from the pump 2 into the pipe 3 is returned into the supply pipe 1 in dependence of the pressure produced by the conveying device and adjusted by the controlling means 5.

The controlling means 5 is operated in known manner by means of the pressure gauge 6. The pipe 3 is connected through the feed pipe 7 to tank 8 wherein the liquid level is to be kept at the height 9. Directly on the wall of the tank 8 at the height of the liquid level 9 there is arranged as conveying device producing counterpressure the gear pump 10 which is by-passed by the pipe 11, in which is arranged a throttle 12. When the liquid level falls below the filling height 9 the gear pump 10 does no longer convey any liquid from the tank into the pipe 7, however the liquid can enter the tank through pump 10 as well as through the opened throttle 12 and the pipe 11. When the liquid level rises up to the height at which the pump 10 is equipped the pump 10 starts to take off the liquid from the tank 8. The quantity being conveyed by the gear pump 10 is larger than that flowing through the throttle 12 so that a counterpressure is produced which is higher than the constant pressure in the feed pipe 7. No liquid is thus conveyed any longer into the tank 8, however the pressure in the by-pass pipe 4 increases and the controlling means 5 operates due to its activation by pressure gauge 6, thereby opening the valve in the by-pass pipe 4, so that liquid is conveyed back into pipe 1.

According to another embodiment of the invention the gear pump 10 can be replaced by a screw conveyer 13, as shown in Fig. 2. The capacity of the screw 13 to convey liquids is adjusted in such a manner that, when the screw conveyer 13 emerges from the liquid, an adequate quantity of liquid enters the tank in spite of the motion counteracting the inflow current, whereas, when the screw conveyer immerses in the liquid, a counterpressure is produced which prevents the inflow of further quantities of liquid through the feed pipe 7.

The pump comprising a casing in which is a cylindrical roll designed so as to form a wedge-shaped clearance between the casing and the roll described in my copending application Ser. No. 334,297, may also be employed to maintain a liquid in a tank at a constant level, as shown in Fig. 3. The feed pipe 7 for the liquid is arranged at a spot at which, while the roll 14 rotates, a counterpressure is produced when the roll immerses down to the liquid level 9. If however liquid is drawn off and the roll 14 partly emerges from the liquid the counterpressure is not so high as to overcome the constant pressure in the feed pipe 7 and, consequently, liquid enters the tank.

The herein described apparatus is of particular importance in the degasification of liquids in a continuous operation, in the evaporation of solvents and in the evacuation of foaming liquids. The apparatus may be employed for instance to degas viscose and to maintain spinning solutions at a constant level even when the spinning solutions are to be evacuated at the same time.

I claim:

1. Apparatus for maintaining liquids at a constant level in a tank having a liquid inlet, which comprises conduit means connected to the liquid inlet of the tank, first means for passing liquid under substantially constant pressure through said conduit means to said liquid inlet, and second means for passing liquids in said conduit in a reverse direction for producing a counter pressure in said conduit means opposite to and greater than the substantially constant pressure induced by said first means when the liquid level in said tank reaches a predetermined level.

2. Apparatus according to claim 1, in which said second liquid conveying means is pump means positioned in said inlet adjacent to said tank at the predetermined liquid level in said tank, said pump means being operative to effect said counter pressure.

3. Apparatus according to claim 2, in which said pump means is a continuous moving gear pump.

4. Apparatus according to claim 2, in which said pump means is a continuous moving screw conveyor pump.

5. Apparatus according to claim 2, in which said pump means is a pump comprising a casing having a continuously moving cylindrical roll positioned therein in such a manner as to form a wedge-shaped clearance between said casing and said roll.

6. Apparatus according to claim 2, which includes by-pass conduit means connecting said conduit means with said tank, and including valve means positioned in said by-pass conduit means for controlling the flow of liquid therethrough.

References Cited in the file of this patent

FOREIGN PATENTS 225,031    Switzerland _____ Apr. 1, 1943